(12) United States Patent
Kagan

(10) Patent No.: US 7,184,904 B2
(45) Date of Patent: Feb. 27, 2007

(54) SYSTEM AND METHOD FOR PROVIDING UNIVERSAL ADDITIONAL FUNCTIONALITY FOR POWER METERS

(75) Inventor: Erran Kagan, Port Washington, NY (US)

(73) Assignee: Electro Industries/GaugeTech, Westbury, NY (US)

( * ) Notice: Subject to any disclaimer, the term of this patent is extended or adjusted under 35 U.S.C. 154(b) by 27 days.

(21) Appl. No.: 11/091,254

(22) Filed: Mar. 28, 2005

(65) Prior Publication Data

US 2006/0161396 A1 Jul. 20, 2006

Related U.S. Application Data

(60) Provisional application No. 60/645,439, filed on Jan. 20, 2005.

(51) Int. Cl.
*G01R 1/00* (2006.01)

(52) U.S. Cl. .............................. 702/62; 702/61; 702/57; 324/114

(58) Field of Classification Search ............ 702/60–62, 702/57, 64, 65, 122, 187, 188, 107, 123, 702/119
See application file for complete search history.

(56) References Cited

U.S. PATENT DOCUMENTS

| 5,459,459 | A  | * | 10/1995 | Lee, Jr. ................. 340/870.02 |
| 5,631,554 | A  | * | 5/1997  | Briese et al. ............ 324/76.77 |
| 5,631,843 | A  | * | 5/1997  | Munday et al. ............. 700/286 |
| 5,715,390 | A  | * | 2/1998  | Hoffman et al. .............. 726/20 |
| 5,742,512 | A  | * | 4/1998  | Edge et al. .................... 702/57 |
| 6,459,258 | B1 | * | 10/2002 | Lavoie et al. ................ 324/142 |
| 6,504,357 | B1 | * | 1/2003  | Hemminger et al. ........ 324/142 |
| 6,735,535 | B1 | * | 5/2004  | Kagan et al. .................. 702/61 |
| 6,778,920 | B1 | * | 8/2004  | Balch et al. .................. 702/62 |
| 6,784,806 | B1 | * | 8/2004  | Lee et al. .............. 340/870.02 |
| 6,813,571 | B2 | * | 11/2004 | Lightbody et al. ............ 702/62 |
| 6,885,185 | B1 | * | 4/2005  | Makinson et al. .......... 324/142 |

OTHER PUBLICATIONS http://www.landisgyr.us/Landis_Gyr/Meters/2510_socket_meter.asp (dated Jul. 21, 2005), 16 pages.

* cited by examiner

*Primary Examiner*—Hal Wachsman
(74) *Attorney, Agent, or Firm*—Carter DeLuca Farrell & Schmidt, LLP

(57) ABSTRACT

A system and method for providing an additional option function to existing functionality of a meter device configured for measuring parameters of energy is provided. The meter device is coupled with an option device for exchanging data between the coupled devices along at least one data path, including exchanging initialization data provided by the option device between the meter device and the option device, wherein the initialization data is useable by the meter device for configuring at least one of the meter device and the option device to be in condition to operate with the other of the meter device and the option device. The exchanged data is processed. Upon the coupling of the devices and the exchanging of the initialization data, the meter device is operated with the option device for adding the option function to existing functionality of the meter device.

9 Claims, 2 Drawing Sheets

SYSTEM AND METHOD FOR PROVIDING UNIVERSAL ADDITIONAL FUNCTIONALITY FOR POWER METERS

This application claims priority under 35 U.S.C. §119 to U.S. Provisional Application Ser. No. 60/645,439; filed on Jan. 20, 2005, and entitled "Universal Option Slot For A Power Meter", the entire contents of which are expressly incorporated herein in their entirety.

BACKGROUND

1. Field

This disclosure relates to meters for measuring parameters of electrical energy. In particular, this disclosure relates to a system and method for providing universal additional functionality for energy meters.

2. Description of the Related Art

Electrical utility companies ("utilities") track electric usage by customers by using power meters. These meters track the amount of power consumed at a particular location, such as a substation. The electric utility companies may use the power meter to charge its customers for their power consumption, i.e., revenue metering.

Traditionally, power meters used mechanical means to track the amount of consumed power. The inductive spinning disk power meter is still commonly used. The spinning disk drives mechanical counters that track the power consumption information. A display device, such as a dial, is provided for displaying the measurements read, which can then be manually recorded as desired by an operator.

Newer to the market are electronic power meters. Electronic meters have replaced the older mechanical meters, and utilize digital sampling of the voltage and current waveforms to generate power consumption information. A display device, such as an LED for displaying digital data, is provided for displaying the measurements read. In many instances it is desirable to further process or utilize the measurements. It has been customary to provide a power meter with selected capabilities or options, such as for further processing the measurements, transmitting the measurements via a desired communication medium, or controlling other devices in accordance with the measurements. Typically, a customized meter is provided having options selected in accordance with the intended application that the meter is used in. From a manufacturing point of view, customization of individual meters is costly. Furthermore, upgrading the meter to include additional options is typically performed at the field by an expert and requires customized programming of the upgraded meter. Experience has shown that operators of the meter rely heavily on technical support for learning how to use the meter's options and for troubleshooting problems, all of which is costly to the manufacturer. The additional costs are most likely passed on to the customer.

Therefore, it is an aspect of the disclosure to provide a power meter which may be used with a variety of options, where the options are exchangeable or replaceable with simple and minimal actions by an operator of the meter.

It is further an aspect of the disclosure to provide a variety of options in which the respective options are packaged for simple installation with a meter by an operator of the meter.

SUMMARY

In accordance with the present disclosure, an option device is provided for coupling with a meter device that is configured for measuring parameters of energy. The option device includes at least one component for providing an option function and at least one nonvolatile storage device for storing data including initialization data useable by the meter device for configuring at least one of the meter device and the option device to be in condition to operate with the other of the meter device and the option device. The option device further includes at least one connector for coupling with the meter device for exchanging data with the meter device along at least one data path, the exchanged data including the initialization data, and at least one processor for at least one of processing data exchanged with the meter device and communicating with the at least one component. Upon coupling the at least one connector with the meter device, the meter device operates with the option device for adding the option function to existing functionality of the meter device.

In accordance with another embodiment of the disclosure, the at least one connector of the option device includes a first connector for coupling the at least one nonvolatile storage device with the meter device for exchanging the initialization data between the at least one storage device and the meter device, and a second connector for coupling the at least one processor and the meter device for exchanging data there between. Furthermore, isolator circuitry is provided along a path established between the at least one processor and circuitry of the meter device and passing through the second connector for electrically isolating the meter device from the option device.

In accordance with yet another embodiment of the disclosure, a method is provided for providing an additional option function to existing functionality of a meter device configured for measuring parameters of energy. The method includes the steps of coupling the meter device with an option device and exchanging data between the coupled devices along at least one data path including exchanging initialization data provided by the option device between the meter device and the option device. The initialization data is useable by the meter device for configuring at least one of the meter device and the option device to be in condition to operate with the other of the meter device and the option device. The method further includes the steps of processing the exchanged data, and operating the meter device with the option device for adding the option function to existing functionality of the meter device upon exchanging initialization data and coupling the meter device with the option device. In accordance with still another embodiment of the disclosure, the method includes electrically isolating the meter device from the option device along at least one data path of the at least one data path.

In accordance with still another embodiment of the disclosure, a meter device configured for measuring at least one parameter of energy is provided. The meter device includes at least one input line for receiving energy to be measured, and circuitry for processing the received energy. At least one connector is provided for coupling to an option device providing an option function for exchanging data therebetween, the exchanged data including initialization data provide by the option device. At least one processor is provided for using the initialization data for configuring at least one of the meter device and the option device to be in condition to operate with the other of the meter device and the option device. Upon coupling the respective option device to the at least one connector, the at least one of the meter device and the option device is configured in accordance with the initialization data and the meter device is operated with the option device for adding the option function to existing functionality of the meter device.

In accordance with a further embodiment of the disclosure, the at least one connector of the meter device includes a first connector for coupling with the option device for providing for transmission of initialization data provided by at least one storage device of the option device to the meter device and a second connector for coupling with the option device for providing for exchanging of data between at least one processor of the option device and the meter device. The meter device further includes isolator circuitry coupled to the second connector for electrically isolating the meter device from the at least one processor of the option device.

BRIEF DESCRIPTION OF THE DRAWINGS

Various embodiments of the disclosure will be described herein below with reference to the figures wherein.

DETAILED DESCRIPTION OF THE PREFERRED EMBODIMENTS

Figure 1:
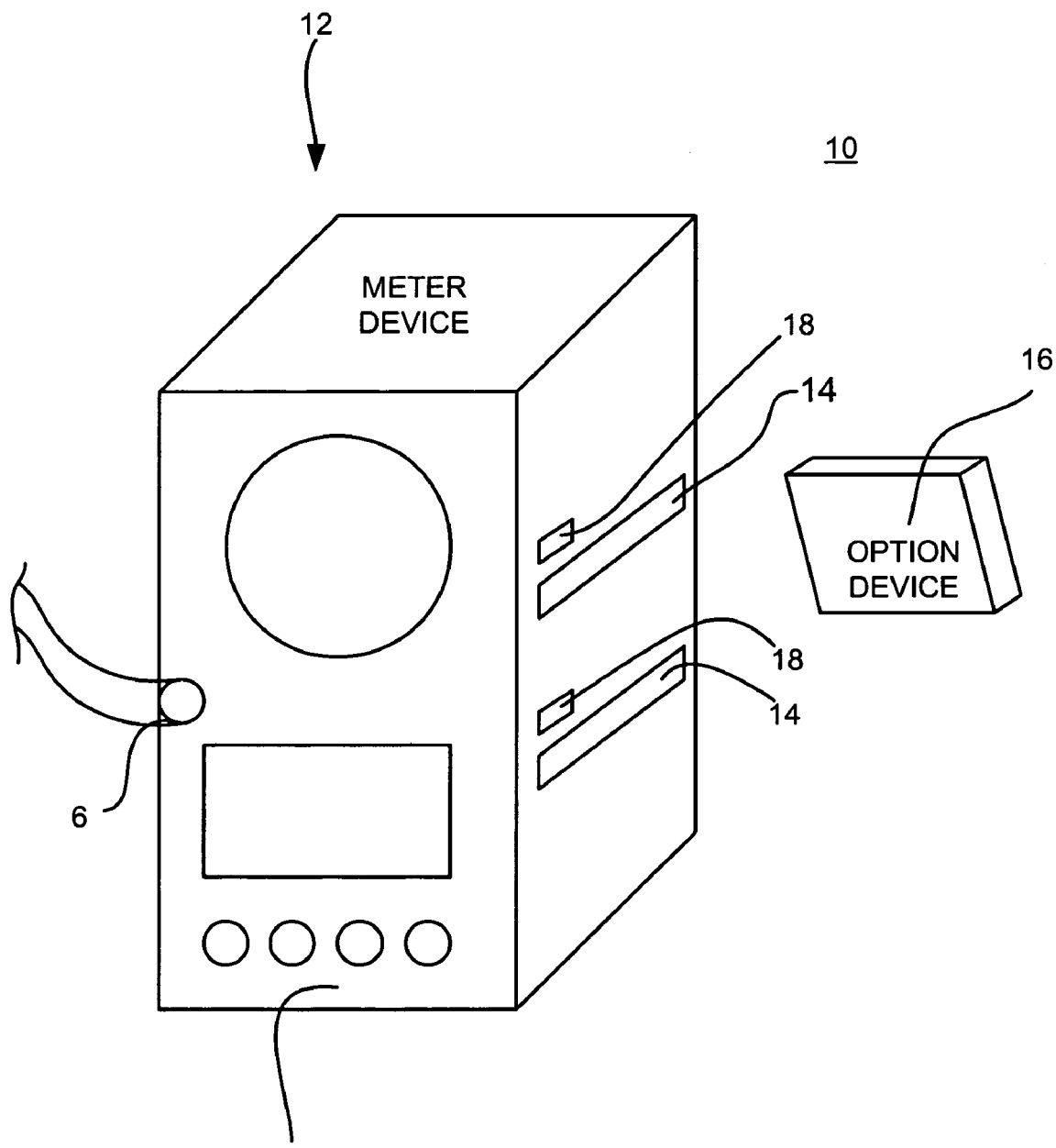
FIG. 1 is a front perspective view of a metering system for measuring energy parameters having a meter device and at least one option device for installation within the meter device in accordance with the present disclosure.

Referring now to the drawings wherein like reference numerals identify similar structural elements, there is illustrated in FIG. 1 a metering system 10 having a meter device 12 provided with at least one option interface 14 configured for receiving a respective option device 16. A respective option device 16 may be installed with (e.g., coupled to) or removed from a desired option interface 14, where the respective option interfaces 14 are preferably substantially identical in configuration, e.g., standardized. The respective option devices 16 are provided with an associated option function, where different option devices 16 have different associated option functions. Installation of a respective option device 16 provides the associated option function to the meter device 12, thus providing the meter device 12 with additional functionality in addition to its existing functionality. The installation and provision of the option function to the meter device 12 is performed in a plug-n-play fashion. Configuration of the meter device 12 and/or option device 16 for operating together is performed automatically and in real-time upon plugging the option device 16 into the meter device 12 without any further intervention, such as by an operator. Furthermore, the option devices 16 may be swapped, e.g., a first option device 16 may be removed from an option interface 14, and a second option device 16 may installed in the same option interface 14 for replacing the first option device 16.

The option interface 14 includes mechanical features (not shown) for receiving and holding an inserted option device 16, such as a connector similar to a printed circuit board (PCB) edge card connector. The option interface 14 may further include mechanical features (not shown) for ejecting the option device 16 upon request. Ejection of an option device 16 from an option interface 14 may be initiated, for example, by actuation of an ejection button 18 and/or by software control signals. The option device 16 may also be manually removed from the option interface 14.

The meter device 12 includes at least one input line 6 for receiving at least one energy input (e.g., current, voltage or power). The meter device 12 reads one or more parameters of the input energy and generates corresponding measured values. The meter device 12 may further generate additional signals, such as control signals, which relate to the inputs to the meter device 12. The meter device 12 may be, for example, a panel meter (e.g., for use with a switchboard) or a revenue meter (e.g., for use at a substation or at the site of a user of the energy). The meter device 12 further includes a control panel 20, which may include at least one display, and at least one user input device (e.g., a keypad, control switches and/or knobs).

Figure 2:
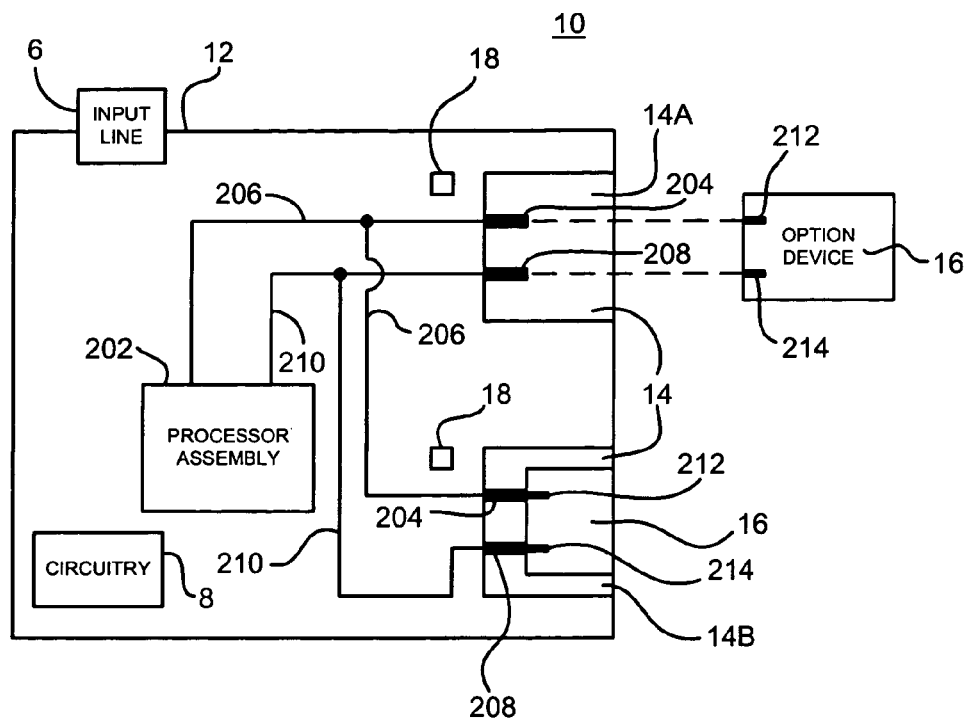
FIG. 2 is a schematic diagram of the meter system shown in FIG. 1.

With reference to FIG. 2, the meter device 12 includes circuitry 8 for processing the energy received at the input line 6. The circuitry 8 may include, for example, step-down circuitry, at least one amplifying device (e.g., an operational amplifier), a current transformer, sample and hold circuitry, analog to digital converter circuitry, multiplexer device, filter circuitry, or a combination thereof for processing the received inputs and generating a corresponding measured value. The meter device 12 further includes a processor assembly 202 including at least one processor (e.g., a digital signal processor (DSP)) and at least one storage device (e.g., RAM, ROM, EPROM, flash memory, etc.) accessible by the at least one processor. During operation of the meter device 12, the processor assembly 202 of the meter device 12 executes a series of programmable instructions which may be stored in the at least one storage device.

The meter device 12 is shown having first and second option interfaces 14A and 14B, respectively, each having an option device 16 coupled thereto. The interfaces 14A and 14B are shown as slots which receive an option device 16 and couple with the option device 16 when the option device 16 is inserted in the slot. An exploded view is provided of interface 14A and the corresponding inserted option device 16 for showing connecting elements between the interface 14A and corresponding inserted option device 16. The interfaces 14A and 14B are not limited to being configured as slots, and other types of interfaces may be used, which may include cables, physically mating connectors, and/or wireless connectors, etc.

The respective interfaces 14A,B of the meter device 12 include at least one of a first connector 204 in communication with a first data path 206 (e.g., data bus) and a second connector 208 in communication with a second data path 210 (e.g., data bus). The option device 16 includes at least one of a first connector 212 and a second connector 214, wherein the first connector 212 mates with connector 204 of the interface 14, and the second connector 214 mates with connector 208 of the meter device 12.

The first and second data paths 206 and 210, respectively, communicate with the processor assembly 202, where in the preferred embodiment the first data path 206 is serial and the second data path 210 is parallel, but is not limited thereto. It is contemplated that more than one first data path 206 and/or second data path 210 is provided, where respective option devices 16 are coupled to different data paths of the more than one first data path 206 and/or second data path 210. The data paths of the more than one first data path 206 may be joined or disjoint (e.g., independent of one another). Likewise, data paths of the more than one second data path 210 may be joined or disjoint. It is further contemplated that data paths 206 and/or 210 are coupled to a device in the meter device 12 other than the processor assembly 202.

Figure 3:
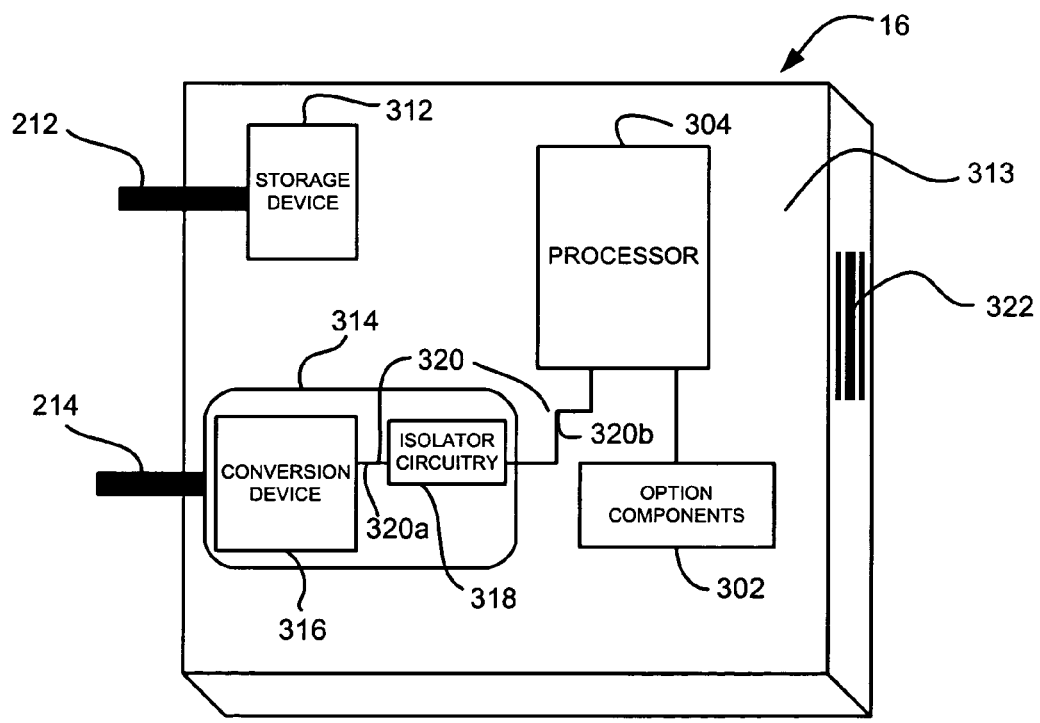
FIG. 3 is a schematic diagram of an option device shown in FIG. 1.

With respect to FIG. 3, option device 16 is shown in greater detail. The option device 16 is packaged for easy installation with the meter device 12, and preferably as an option device for insertion within a slot of the option interface 14. The option device 16 includes at least one option component 302 for performing an associated option function provided by the option device 16, and a processor 304 for communicating with the meter device 12 and with the option components 302 (e.g., for sharing data and/or providing control thereto). During operation of the option device 16, the processor 304 of the option device 16 executes a series of programmable instructions which may be stored in at least one storage device accessible by the processor 304 and preferably integrated with the processor 304. The processor assembly 202 and the processor 304 preferably operate in a master/slave relationship.

The option device 16 further includes a non-volatile storage device 312, e.g., an EEPROM. Connector 212 of the option device 16 is coupled to the storage device 312 and is exposed from a housing 313 of the option device 16 for mating with connector 204 of the option interface 14. When the option device 16 is coupled to the option interface 14 (e.g., inserted into the corresponding slot) a data stream (preferably serial) is transmitted from the storage device 312, through the connector 212 of the option device 16 and to the connector 204 of the option interface 14, and/or vice versa. In a preferred embodiment of the disclosure, when the option device 16 is coupled to the meter device 12 and a data path is established from the storage device 312 to the meter device 12, the storage device 312 begins to transmit the initialization data continually.

Data stored in the storage device 312 includes initialization data, which may include, forexample, identification data identifying the option device 16, calibration data and/or setup data which the meter device 12 may use for configuring itself to operate in conjunction with the option device 16 for providing the associated option function of the option device 16 as additional functionality to the meter device 12 in addition to existing functionality of the meter device 12. The initialization data is sufficient for preparing the meter device 12 to operate with the option device 16 for adding the additional option function to the existing functionality of the meter device 12. Preferably, the storage device 312 is tested, calibrated and programmed (e.g., the initialization data is stored therein) by the manufacturer of the option device 16. Testing and calibrating the option device 16 may include injecting a known energy (e.g., voltage or current) into the device and measuring the corresponding output energy and determining the corresponding gain factor and/or offset factor, which are included in the initialization data. It is contemplated that a user or the manufacturer may re-configure the option device 16 by re-programming it, such as by adding or changing information stored by the storage device 312. For example, after prolonged use of the option device 16 the option device 16 may need to be recalibrated and have updated initialization data stored therein. The option device 16 may also be configurable by a user before installation in the meter device 12. User configuration of the option device 16 may include selection of a protocol, baud rate, clock setting, etc. The user configured settings are included in the initialization data. The configuration settings are stored on the option device 16 and are retained when the option device 16 is de-energized or removed from the meter device 12.

The processor assembly 202 continually checks for the presence of the option device 16, preferably by checking for receipt of data from storage device 312, such as by polling a flag, an address or a register. Accordingly, the processor assembly 202 recognizes when the option device 16 has been coupled (e.g., installed with the meter device 12), replaced (e.g., removed from the meter device 12 and another option device 16 coupled to the meter device 12), or removed from the meter device 12. The option devices 16 may be installed, replaced or removed before power-up of the meter device 12 and/or during usage of the meter device 12.

Upon detecting that an option device 16 has been installed or replaced, e.g., upon power-up of the meter device 12 or installation of an option device 16, the processor assembly 202 uses the initialization data to configure the meter device 12 to operate with the option device 16, which may include transmitting data to the processor 304 for configuring the option device 16 to operate with the meter device 12. Configuration of the meter device 12 also includes detecting if the configuration state of the option device 16, including if the option device 16 has been configured by a user, and to what degree. The meter device 12 operates with the option device 16 in its configured state using the configuration data. Accordingly, upon installing or plugging the option device 16 into the meter device 12, the meter device 12 recognizes the installation in real-time and automatically configures itself using the initialization data to operate with the option device 16, including adding the option function to the meter device's existing functionality, such as in a plug-n-play fashion.

The initialization data may include parameter values and/or programmable instructions. A parameter value of the initialization data may be used to calibrate the meter device 12 to operate compatibly with the option device 16. The data identifying the option device 16 may be used for retrieving from a storage device accessible by the processor assembly 202 one or more parameter values which correspond to the option device 16. A parameter value may include, for example, a gain factor and an offset factor for the option device 16, which the processor assembly 202 will use during gain computations or will pass to the processor 304 to use during gain computations. during operation of the meter device 12.

A parameter value or identification data may further be used by the processor assembly 202 to retrieve a selected set of executable software instructions from a storage device accessible by the processor assembly 202. Preferably, the storage device is incorporated into the meter device 12. The retrieved set of executable software instructions is executed by the processor assembly 202 for the meter device 12 to operate with the option device 16 for adding the option function of the option device 16 to the existing functionality of the meter device 12. Furthermore, programmable instructions included with the initialization data may be executed by the processor assembly 202 for the meter device 12 to operate with the option device 16 for adding the option function of the option device 16 to the existing functionality of the meter device 12.

Additionally, the option device 16 may include an interface device 314 for providing an interface between the processor 304 of the option device 16 and the processor assembly 202 and/or other devices of the meter device 12 for allowing communication therebetween when the option device 16 is coupled to the meter device 12. Connector 214 of the option device 16 is coupled to the interface device 314 and exposed from the housing 313 for mating with connector 208 of the interface 14.

In a preferred embodiment of the disclosure, the interface device 314 includes at least one parallel/serial conversion device 216, such as a Universal Asynchronous Receiver/Transmitter (UART) device, for converting data having a serial format into data having a parallel format, and vice versa. Accordingly, data exchanged via connector 214 has a parallel format, where data transmitted along data path 320 has a serial format. The interface device 314 preferably further includes isolator circuitry 318 having a device such as an optical-electrical isolator, for electrically isolating data path 320a from data path 320b, and the meter device 12 from the option device 16 for providing protection to the isolated devices from ground loops, short circuits, noise, surges, etc.

Data transmitted in parallel format from the processor assembly 202 and/or other devices of the meter device 12 which is received by the conversion device 16 is converted to serial format. The serial data passes through the isolator circuitry 318 along data path 320 and to the processor 304. Likewise, data transmitted in serial format from the processor 304 along data path 320 passes through the isolator circuitry 318, and then is received by the conversion device 16, which converts the data to parallel format and is provided to the processor assembly 202 and/or other devices of the meter device 12 via connector 214, connector 208 and bus 210.

It is contemplated that the conversion device 316 and/or the isolator circuitry 318 be provided in the meter device 12 instead of, or in addition to, being provided in the option device 16. For the embodiment in which data path 210 is parallel (e.g., includes a plurality of parallel data paths) the conversion device 316 and the isolator circuitry 318 are provided with the option device 16, the data path 320 is serial, and one electro-isolator is provided along data path 320, which is beneficial for minimizing costs and complexity of the meter device 12.

It is further contemplated that the processor 304 utilizes a parallel protocol and transmits and receives data in parallel format. In one embodiment, a second conversion device 316 is provided in between the processor 304 and the isolator circuitry 318. Accordingly, data being exchanged with the processor 304 passes serially through the isolator circuitry 318. In another embodiment of the disclosure, data is exchanged in parallel (e.g., along a plurality of parallel data paths) between the meter device 12 (e.g., the processor assembly 202 and/or or other devices of the meter device 12) and the processor 304, and the conversion device 316 is omitted. Isolator circuitry 318 is provided for operating on each path of parallel data. It is further contemplated that the processor assembly 202 and/or other devices of the meter device 12 and the processor 304 utilize a serial protocol, and data is exchanged along a single data path. Conversion device 316 is omitted, and the isolator circuitry 318 is provided along the single data path.

The option device components 302 include one or more digital and/or analog devices which add functionality to the meter device 12, such as providing for processing signals generated by the meter device 12 and generating output signals. The option device components 302 may include at least one input/output (I/O) device 322, for transmitting the output signals via a wired or wireless communication medium using a communication protocol, such as a serial, parallel, Ethernet, Internet, etc., protocol.

A first example of an option device 16 is a fiber optic port, preferably for providing serial fiber optic communication. Preferably, the communication protocol used is half duplex, and circuitry is provided for allowing the option device to be used in a closed loop. The protocol is preferably user selectable during configuration, such as from Modbus RTU, Modbus ASCII, or distributed network protocol (DNP) 3.0 protocols. The address for the option device is also preferably user selectable during configuration, such as from addresses ranging between 1 and 247. The baud rate is preferably user selectable during configuration, such as from a speed of 9600; 19,200; 38,400; or 57,600 baud. The byte structure is preferably user selectable during configuration, such as from 5, 6, 7, or 8 bits. Parity is preferably user selectable during configuration, such as from even, odd or none. Stop bits are preferably user selectable during configuration, such as to 1 or 2. A reply delay (an intentional delay prior to responding to a data request) is preferably user selectable during configuration, such as ranging from 0 to 500 milliseconds in increments, e.g., increments of 50 milliseconds.

A second example of an option device 16 is an Ethernet card for automatically sensing and connecting to either a network connection, such as a 10 or 100 MHz LAN connection. Preferably, the option device 16 supports multiple, e.g., twelve, simultaneous socket connections. Preferably, networking features, such as the IP address, Subnet Mask, and Gateway address are user selectable during configuration. Preferably the option device 16 supports a dynamic host configuration protocol (DHCP) connection. Additionally, the option device 16 includes a standard network connector, such as an RJ-45 jack.

A third exemplary option card 16 is a digital I/O relay option card for providing two status inputs. Preferably, inputs are received via several, e.g., three pins, including one common and two channels, which preferably automatically adjust to a connection with dry contacts or wetted voltage signals. The inputs are sampled at regular intervals, such as 100 millisecond intervals, and are de-bounced. Preferably, the status of each input is stored in readable registers that are accessible via another communication port, e.g., using a protocol, such as Modbus or DNP protocols. Preferably, one of the input channels is configurable to sense an end-of-interval pulse from an external energy meter.

The digital I/O relay option device preferably includes multiple, e.g., three, relay outputs controllable through a communication port using a compatible protocol. The relays are preferably user configurable to operate automatically in response to meter limit conditions, including application of hysteresis to more than one limit. Preferably, a user selectable delay time is provided for delaying a reset procedure when relays are assigned to limits.

A fourth example of an option device 16 is a digital I/O energy pulse counting option card for counting received digital pulses and converting the pulses into corresponding energy usage values. The digital I/O energy pulse counting option card preferably provides a (e.g., one) status input, e.g., through two pins, including one common and one channel which automatically adjusts to connection to dry contacts or wetted voltage signals. Preferably, the input is sampled at regular intervals, e.g., 100 milliseconds intervals, and de-bounced. The status of each input is preferably stored in readable registers accessible via a communication port using a protocol, such as Modbus or DNP protocols. The inputs are preferably configured to sense an end-of-interval pulse from an external energy meter.

A fifth option device is an analog output option device having multiple (e.g., four) analog outputs for outputting 0–±1 mA proportional to a received input. The channels measure a quantity which is preferably selectable by the user from voltage, current, watt, VAR, VA or frequency. Additionally, the magnitude of the scalar quantity that corresponds to 0 mA and to 1 mA for each channel is preferably user selectable during configuration, such as defined by set points, which may be positive or negative numbers. Each channel provides an output that is linear between the set points as the scalar quantity changes between the set points.

Furthermore, each channel is preferably configurable as unidirectional or bidirectional, where when the channel is configured as bidirectional, the channel produces an output from −1 mA to +1 mA, and the set points are −1 and +1 mA. Preferably, the analog output option device is self-powered to provide 1 mA into a 10 kΩ load for each channel, with each channel capable of producing an output of 20% over rating.

A sixth option card is an analog output option card having eight analog output channels connected through one common and eight channel connections for providing an output from 0 to 20 mA. The channels measure a quantity which is preferably selectable by the user from voltage, current, watt, VAR, VA, frequency, power factor, phase angle, harmonic magnitude and harmonic angle. Set points are preferably user selectable for specifying the magnitude of the scalar quantity that corresponds to 4 mA and to 20 mA for each channel. These set points may be positive or negative numbers. Each channel preferably provides an output that is linear between the set points as the scalar quantity changes between the set points. Preferably, the analog output option device is self-powered to provide 20 mA into a 250 Ω load for each channel, with each channel capable of producing an output of 20% over rating.

Accordingly, a respective option device 16 may generate and output analog retransmit signals, pulse signals, digital communication signals, Ethernet signals, control signals, or other telemetric outputs, where the output signals are based on the measured values. The output signals may be transmitted to an external device (not shown), such as a server, another processing device, a cellular phone, a controllable device, etc. It is contemplated that the I/O device 322 may receive information from an external device (not shown) which the processor 304 may process, and/or provide to the meter device 12 via the interface device 314 and the connector 214.

In a preferred embodiment in accordance with the present disclosure, the option device 16 is installed with the meter device 12 by coupling connectors 212 and 204 and connectors 214 and 208, which may be accomplished, for example, by inserting the option device 16 in an option device slot of the interface 14 of the meter device 12. Installation of the option device 16 with the meter device 12 adds functionality to the meter device 12. Preferably, the option devices 16 and the interfaces 14 are standardized for allowing an operator to install a selected option device 16 with the meter device 12 for adding functionality to the meter device 12.

The meter device 12 recognizes the presence of the installed option device 16 and is automatically configured to communicate and operate with the option device 16 in order that the functionality of the option device 16 is integrated into the functionality of the meter device 12. The meter device 12 exchanges appropriate information with the option device 16, enabling the option device 16 to operate compatibly with the meter device 12 for adding functionality thereto. More specifically, the processor assembly of the meter device 16 exchanges signals (in at least one direction) with the processor 304 of the option device 16, where the exchanged signals pass through an isolation barrier for protecting the hardware of both of the meter device 12 and the option device 16 and the integrity of the exchanged signals. The exchanged information may include data that relates to the energy inputs received by the meter device 16 and/or control signals.

The meter device 12 may be provided with a desired number of interfaces 14, each available for coupling with an option device 16. When multiple option devices 16 are coupled to the meter device 12, the functionality of the meter device 12 may be increased to include the option function provided by each of the option devices 16. Prioritization data may be provided, where needed, for determining prioritization of the added option functions, when one option function may override another, which option function may override another, etc. The prioritization data may be provided via the meter device 12 and/or the option device 16.

Multiple option devices 16 may be packaged as a kit, where two or more option devices 16 may be installed with the meter device 12 at a time, and/or a first option device 16 providing a first option function of the kit may be interchanged with a second option device 16 providing a second option function of the kit for changing the functionality of the meter device 12 from including the first option function to include the second option function instead of the first option function. Furthermore, the meter device 12 may be included with the kit. Additionally the option devices 16 and/or a kit of option devices 16 may operate with a variety of meter devices 12.

In accordance with the above disclosure, the meter device 12 may operate for increasing functionality of the meter device 12 with any option device 16 designed for compatibility with the meter device 12, such as in accordance with a standard which may specify dimensions of the option device 16, the types of connectors to be used and the type of protocol to be used. A universal increase of functionality of meter devices is available to all meter devices and option devices which adhere to the standards.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

The invention claimed is:

1. A method for providing an additional option function to existing functionality of a meter device of the type configured for measuring parameters of energy, the method comprising the steps of:

coupling the meter device of the type configured for measuring parameters of energy with an option device providing an option function;

exchanging data between the coupled devices along at least one data path, comprising the step of:

exchanging initialization data provided by the option device between the meter device and the option device, wherein the initialization data is useable by the meter device for configuring at least one of the meter device and the option device to be in condition to operate with the at least one of the meter device and the option device;

processing the exchanged data;

operating the meter device with the option device for adding the option function to existing functionality of the meter device upon exchanging initialization data and coupling the meter device with the option device; and uncoupling the meter device and the option device;

coupling the meter device with another option device providing another option function;

exchanging data between the meter and the another option devices along at least one data path, comprising the step of:

exchanging initialization data provided by the another option device between the meter device and the another option device, wherein the initialization data is useable by the meter device for at least one of the meter device and the another option device to be in condition to operate with the at least one of the meter device and the another option device;

processing the data exchanged between the meter and the another option devices; and operating the meter device with the another option device for adding the another option function to the existing functionality of the meter device upon exchanging initialization data and coupling the meter device with the another option device.

2. The method according to claim 1, further comprising the step of operating the meter device before performing the coupling step.

3. The method according to claim 1, wherein the initialization data includes identification data identifying the option device and the configuring step includes using the identification data to configure the meter device to operate with the option device for adding the option function to the existing functionality of the meter device.

4. The method according to claim 1, wherein the initialization data includes a gain factor and an offset factor corresponding to the gain of the option device.

5. The method according to claim 1, wherein the initialization data includes executable instructions for execution by a processor of the meter device, and the configuring step includes using the executable instructions.

6. The method according to claim 1, further comprising the step of electrically isolating the meter device from the option device along at least one data path of the at least one data path.

7. A method for providing an additional option function to existing functionality of a meter device of the type configured for measuring parameters of energy, the method comprising the steps of:

coupling the meter device of the type configured for measuring parameters of energy with an option device providing an option function;

exchanging data between the coupled devices along at least one data path, comprising the step of:

exchanging initialization data provided by the option device between the meter device and the option device, wherein the initialization data is useable by the meter device for configuring at least one of the meter device and the option device to be in condition to operate with the at least one of the meter device and the option device;

processing the exchanged data;

operating the meter device with the option device for adding the option function to existing functionality of the meter device upon exchanging initialization data and coupling the meter device with the option device; and converting data exchanged from at least one of data having a serial format into data having a parallel format, and data having a parallel format into data having a serial format.

8. A method for providing an additional option function to existing functionality of a meter device of the type configured for measuring parameters of energy, the method comprising the steps of:

coupling the meter device of the type configured for measuring parameters of energy with an option device providing an option function;

exchanging data between the coupled devices along at least one data path, comprising the step of:

exchanging initialization data provided by the option device between the meter device and the option device, wherein the initialization data is useable by the meter device for configuring at least one of the meter device and the option device to be in condition to operate with the at least one of the meter device and the option device;

processing the exchanged data;

operating the meter device with the option device for adding the option function to existing functionality of the meter device upon exchanging initialization data and coupling the meter device with the option device;

coupling the meter device with another option device providing another option function;

exchanging data between the meter and the another option devices along at least one data path, comprising the step of:

exchanging initialization data provided by the another option device between the meter device and the another option device, wherein the initialization data is useable by the meter device for configuring the at least one of the meter device and the another option device to be in condition to operate with the at least one of the meter device and the another option device;

processing the data exchanged between the meter and the another option devices; and operating the meter device with the another option device for adding the another option function to the existing functionality of the meter device upon exchanging initialization data and coupling the meter device with the another option device.

9. A meter device configured for measuring at least one parameter of energy comprising:

at least one input line for receiving energy for measuring at least one parameter thereof;

circuitry for processing the received energy;

a first connector for coupling with an option device providing an option function for providing for transmission of initialization data provided by at least one storage device of the option device to the meter device;

a second connector for coupling with the option device for providing for exchanging of data between at least one processor of the option device and the meter device;

isolator circuitry coupled to the second connector for electrically isolating the meter device from the at least one processor of the option device; and at least one processor for using the initialization data for configuring at least one of the meter device and the option device to be in condition to operate with the other of the option device and meter device;

wherein upon coupling the option device to the first and second connectors the at least one of the meter device and the option device is configured in accordance with the initialization data and the meter device is operated with the option device for adding the option function to existing functionality of the meter device.

* * * * *